US009003132B2

(12) United States Patent
Nakazono et al.

(10) Patent No.: US 9,003,132 B2
(45) Date of Patent: *Apr. 7, 2015

(54) DATA PROCESSING APPARATUS AND IMAGE PROCESSING APPARATUS

(75) Inventors: Keisuke Nakazono, Tokyo (JP); Yoshinobu Tanaka, Tokyo (JP); Akira Ueno, Tokyo (JP)

(73) Assignee: Olympus Corporation, Tokyo (JP)

( * ) Notice: Subject to any disclaimer, the term of this patent is extended or adjusted under 35 U.S.C. 154(b) by 528 days.

This patent is subject to a terminal disclaimer.

(21) Appl. No.: 13/285,499

(22) Filed: Oct. 31, 2011

(65) Prior Publication Data

US 2012/0110283 A1 May 3, 2012

(30) Foreign Application Priority Data

Nov. 1, 2010 (JP) ................................. 2010-245479

(51) Int. Cl.
*G06F 12/00* (2006.01)
*G06T 1/20* (2006.01)
*G06T 1/60* (2006.01)
*G06K 9/36* (2006.01)

(52) U.S. Cl.
CPC ........................................ *G06T 1/20* (2013.01)

(58) Field of Classification Search
None
See application file for complete search history.

(56) References Cited

U.S. PATENT DOCUMENTS

| 5,388,074 | A | | 2/1995 | Buckenmaier | |
|---|---|---|---|---|---|
| 5,477,492 | A | * | 12/1995 | Ohsaki et al. | 365/20 |
| 6,112,268 | A | * | 8/2000 | Ohashi et al. | 710/52 |
| 6,161,195 | A | * | 12/2000 | Konishi et al. | 714/5 |
| 6,237,122 | B1 | | 5/2001 | Maki | |
| 6,330,630 | B1 | | 12/2001 | Bell | |
| 7,324,209 | B2 | | 1/2008 | Hill | |
| 7,444,491 | B1 | * | 10/2008 | Steinbusch | 711/170 |
| 7,895,390 | B1 | * | 2/2011 | Olson | 711/101 |
| 2002/0059476 | A1 | | 5/2002 | Yamada | |
| 2004/0090534 | A1 | * | 5/2004 | Nakami et al. | 348/22 |
| 2004/0122988 | A1 | * | 6/2004 | Han et al. | 710/5 |

(Continued)

FOREIGN PATENT DOCUMENTS

| JP | 62-44303 B2 | 9/1987 |
|---|---|---|
| JP | 5-314019 A | 11/1993 |

(Continued)

OTHER PUBLICATIONS

Nick et al. "S/390 cluster technology: Parallel Sysplex." IBM Systems Journal, vol. 36, No. 2, 1997, pp. 172-201.*

(Continued)

*Primary Examiner* — Daniel J. Bernard
(74) *Attorney, Agent, or Firm* — Westerman, Hattori, Daniels & Adrian, LLP

(57) ABSTRACT

A data processing apparatus may include a plurality of buffer units that stores data, a data write control unit that writes input data to any one of the plurality of buffer units by exclusively controlling the plurality of buffer units, and a data read control unit that reads data to be output from any one of the plurality of buffer units by exclusively controlling the plurality of buffer units. The data write control unit may output a data write completion signal indicating that the writing of the data is completed when the writing of the input data is completed. The data read control unit may output a data read completion signal indicating that the reading of the data is completed when the reading of the data to be output is completed.

4 Claims, 12 Drawing Sheets

(56) References Cited

U.S. PATENT DOCUMENTS

| | | |
|---|---|---|
| 2005/0237803 A1 | 10/2005 | Takase et al. |
| 2006/0132874 A1 | 6/2006 | Ishikawa |
| 2007/0143506 A1 | 6/2007 | Raju et al. |
| 2010/0199071 A1 | 8/2010 | Nakazono et al. |
| 2011/0161577 A1* | 6/2011 | Johnson ........................ 711/105 |
| 2012/0110222 A1 | 5/2012 | Dang et al. |

FOREIGN PATENT DOCUMENTS

| | | |
|---|---|---|
| JP | 11-73299 A | 3/1999 |
| JP | 2000-312327 A | 11/2000 |
| JP | 2001-157049 A | 6/2001 |
| JP | 2002-099504 A | 4/2002 |
| JP | 2003-219185 A | 7/2003 |
| JP | 2004-206487 A | 7/2004 |
| JP | 2004-220432 A | 8/2004 |
| JP | 2005-102168 A | 4/2005 |
| JP | 2010-176606 A | 8/2010 |
| WO | 03/036960 A1 | 5/2003 |

OTHER PUBLICATIONS

U.S. Non-Final Office Action dated Jun. 5, 2013, issued in related U.S. Appl. No. 13/284,571 (11 pages).

U.S. Final Office Action dated Dec. 20, 2013, issued in related U.S. Appl. No. 13/284,571 (11 pages).

Office Action dated Jun. 3, 2014, issued in corresponding Japanese Patent Application No. 2010-245479, with English Translation (4 pages).

Office Action dated Jun. 24, 2014, issued in corresponding Japanese Patent Application No. 2010-245478, with English Translation (5 pages).

Japanese Office Action dated Dec. 16, 2014, issued in Japanese Patent Application No. 2010-245478, w/English translation (6 pages).

Japanese Notice of Allowance dated Dec. 16, 2014, issued in Japanese Patent Application No. 2010-245479, w/English translation (6 pages).

* cited by examiner

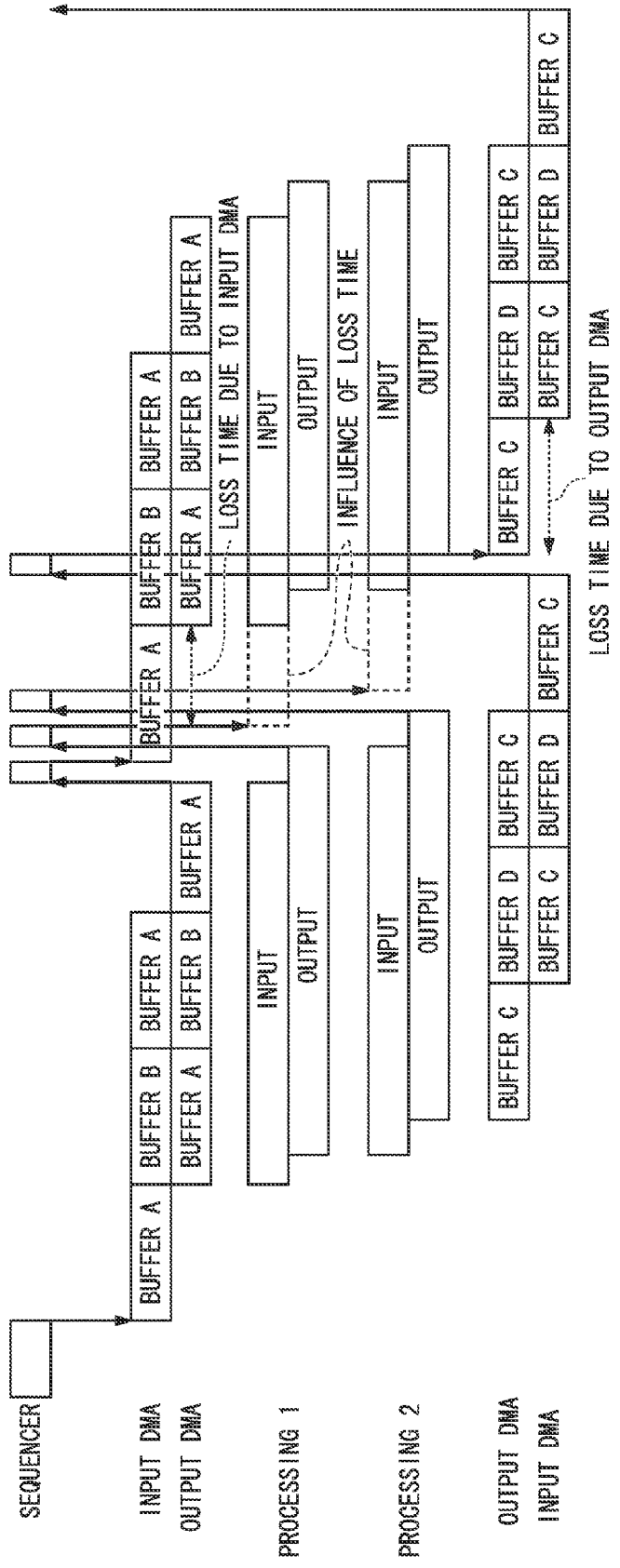

DATA PROCESSING APPARATUS AND IMAGE PROCESSING APPARATUS

BACKGROUND OF THE INVENTION

1. Field of the Invention

The present invention relates to a data processing apparatus and an image processing apparatus.

Priority is claimed on Japanese Patent Application No. 2010-245479, filed Nov. 1, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In an image processing apparatus provided in an imaging apparatus such as a still-image camera, a moving-image camera, a medical endoscope camera, or an industrial endoscope camera, a pipeline process of dividing a still image of one frame into a plurality of blocks and performing a plurality of image processing operations for each divided block is well-known. FIGS. 8A, 8B, and 8C are diagrams illustrating a block division method in the pipeline process and timings of the pipeline process in accordance with the related art. FIGS. 9A and 9B are diagrams illustrating another block division method in the pipeline process and timings of the pipeline process in accordance with the related art.

When a still image of one frame is divided into a plurality of blocks as shown in FIG. 8A, a flow of image data to be processed within each divided block is continuous, but a flow of data between different blocks is not continuous (see FIG. 8B). Thus, a sequencer, which controls the entire pipeline process, resets a range of image data to be processed in each processing module (processing unit) constituting a pipeline, or the like each time before a pipeline process of each block is started (see FIG. 8C). When image processing is controlled for each series of pipeline processes, a period of time loss in which any one of processing modules constituting the pipeline does not operate occurs during processing of blocks. The loss time in which the processing module does not operate affects a processing time of a still image of one frame.

In terms of this loss time, a ratio for a time required to process a still image of one frame is changed according to a size of a block divided to process the still image of the frame. For example, as shown in FIG. 8A, an influence of the loss time on the entire image processing is small because a ratio of a time in which image data is processed is larger than the loss time when the size of the block divided to process a still image of one frame is large, that is, when an amount of image data included in each block is large. Incidentally, as shown in FIG. 9A, a ratio of the loss time is large and largely affects a processing time of the entire image processing, when the size of the block divided to process the still image of one frame is small, that is, when the amount of image data included in each block is small.

Technology for reducing time loss in processing between blocks is disclosed, for example, in Japanese Unexamined Patent Application, First Publication No. 2010-176606. In the technology disclosed in Japanese Unexamined Patent Application, First Publication No. 2010-176606, an interrupt signal (process completion interrupt signal) indicating that a process by a processing module is completed is output to a sequencer for each processing module constituting the pipeline. Every time the process completion interrupt signal is input from the processing module, the sequencer individually changes settings of the processing module. Thereby, the sequencer changes the settings of the processing module every time a process of each processing module is completed, not every time processing of a divided block is started. In the technology of Japanese Unexamined Patent Application, First Publication No. 2010-176606, the time loss in processing between blocks is reduced and a speed of processing a still image of one frame is increased by the sequencer changing the settings of each processing module for every processing module as described above (see FIG. 9B).

However, even when settings change after processing of one block is completed and then processing of the next block is started in a state in which the technology disclosed in Japanese Unexamined Patent Application, First Publication No. 2010-176606 is adopted, there is still a processing module having large time loss among processing modules constituting a pipeline. For example, in a direct memory access (DMA) module having access to data stored in a memory such as a dynamic random access memory (DRAM) connected to a common data bus by DMA, a loss time is changed by a size (capacity) or configuration of a buffer for temporarily storing data included in the module. FIGS. 10A, 10B, and 11 are diagrams illustrating examples of DMA modules having large time loss. FIGS. 10A and 10B are block diagrams illustrating examples of schematic configurations of DMA modules in accordance with the related art. FIG. 10A shows an input DMA module, and FIG. 10B shows an output DMA module. FIG. 11 is a timing chart illustrating an example of timings of a process of a pipeline including the DMA modules in accordance with the related art.

As shown in FIG. 10A, the input DMA module includes two buffers (buffers A and B), a DMA interface (I/F) for acquiring data stored in the DRAM via a common data bus and writing the data to one buffer, and a buffer read circuit for reading data stored in the other buffer and outputting the data to the next processing module. As shown in FIG. 10B, the output DMA module includes two buffers (buffers C and D), a buffer write circuit for writing data output from a previous processing module to one buffer, and a DMA I/F for reading data stored in the other buffer and outputting the data to the DRAM via a common data bus. The DMA modules of the configurations as shown in FIGS. 10A and 10B input and output data in the same period by alternately switching buffer operations (of writing data to one buffer and reading data from the other buffer) using the two buffers.

If technology disclosed in Japanese Unexamined Patent Application, First Publication No. 2010-176606 is adopted in the process of the pipeline including the above-described DMA modules, data is output to the next processing module, or data is output to a DRAM, when writing of data to one buffer of the two buffers is completed, as shown in FIG. 11. However, processing of the next block is started after processing of a block to be currently processed is completed in processing between blocks. Thus, until writing of data to one buffer of the two buffers is completed in processing of the next block, no data is output to the next processing module or no data is output to the DRAM. Thus, as shown in FIG. 11, a time until writing to any one buffer within the DMA modules is completed becomes a loss time in processing between blocks. This loss time also affects other processing modules constituting the pipeline.

FIGS. 12A and 12B are block diagrams illustrating other examples of schematic configurations of DMA modules in accordance with the related art. The loss time is equally applied to a configuration, which includes a plurality of buffers and inputs and outputs data in the same period by sequentially switching the buffers, for example, such as a DMA module having four buffers as shown in FIGS. 12A and 12B, as well as the DMA module including two buffers. If the capacity of each buffer included in the DMA module is large, the influence of the loss time becomes larger.

SUMMARY

The present invention provides a data processing apparatus and an image processing apparatus capable of reducing a loss time during each pipeline process in a process of a pipeline including the data processing apparatus that performs a process by alternately switching a plurality of buffers.

A data processing apparatus may include: a plurality of buffer units that stores data; a data write control unit that writes input data to any one of the plurality of buffer units by exclusively controlling the plurality of buffer units; and a data read control unit that reads data to be output from any one of the plurality of buffer units by exclusively controlling the plurality of buffer units. The data write control unit may output a data write completion signal indicating that the writing of the data is completed when the writing of the input data is completed. The data read control unit may output a data read completion signal indicating that the reading of the data is completed when the reading of the data to be output is completed.

The data write control unit may determine that the writing of the data is completed based on the number of times of writing the data to the plurality of buffer, units by the data write control unit and the preset number of times of writing of the data. The data read control unit may determine that the reading of the data is completed based on the number of times of reading the data from the plurality of buffer units by the data read control unit and the preset number of times of reading of the data.

The data processing apparatus may further include: a buffer information notification unit that retains information of the plurality of buffer units. The information of the buffer units retained in the buffer information notification unit may include: buffer information that indicates whether the data is writable to each of the plurality of buffer units or whether the data is readable from each of the plurality of buffer units; data write information that indicates which of the plurality of buffer units the data is written to; and data read information that indicates which of the plurality of buffer units the data is read from. The data write control unit may determine a buffer unit to which the data is written based on the data write information retained in the buffer information notification unit, and writes input data based on the buffer information corresponding to the determined buffer unit. The data read control unit may determine a buffer unit from which the data is read based on the data read information retained in the buffer information notification unit, and reads data to be output based on the buffer information corresponding to the determined buffer unit.

The data write control unit may change the buffer information and the data write information corresponding to the determined buffer unit when the writing of the data to the determined buffer unit is completed. The data read control unit may change the buffer information and the data read information corresponding to the determined buffer unit when the reading of the data from the determined buffer unit is completed.

An image processing apparatus may include a data processing apparatus. The data processing apparatus may include: a plurality of buffer units that stores data; a data write control unit that writes input data to any one of the plurality of buffer units by exclusively controlling the plurality of buffer units; and a data read control unit that reads data to be output from any one of the plurality of buffer units by exclusively controlling the plurality of buffer units. The data write control unit may output a data write completion signal indicating that the writing of the data is completed when the writing of the input data is completed. The data read control unit may output a data read completion signal indicating that the reading of the data is completed when the reading of the data to be output is completed. The data write control unit may perform settings related to writing of image data after the data write completion signal is output. The data read control unit may perform settings related to reading of the image data after the data read completion signal is output.

According to the present invention, it is possible to reduce a loss time during each pipeline process in a process of a pipeline including a data processing apparatus that performs a process by alternately switching a plurality of buffers.

BRIEF DESCRIPTION OF THE DRAWINGS

The above features and advantages of the present invention will be more apparent from the following description of certain preferred embodiments taken in conjunction with the accompanying drawings, in which:

FIG. 11 is a timing chart illustrating an example of timings of a process of a pipeline including the DMA modules in accordance with the related art.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
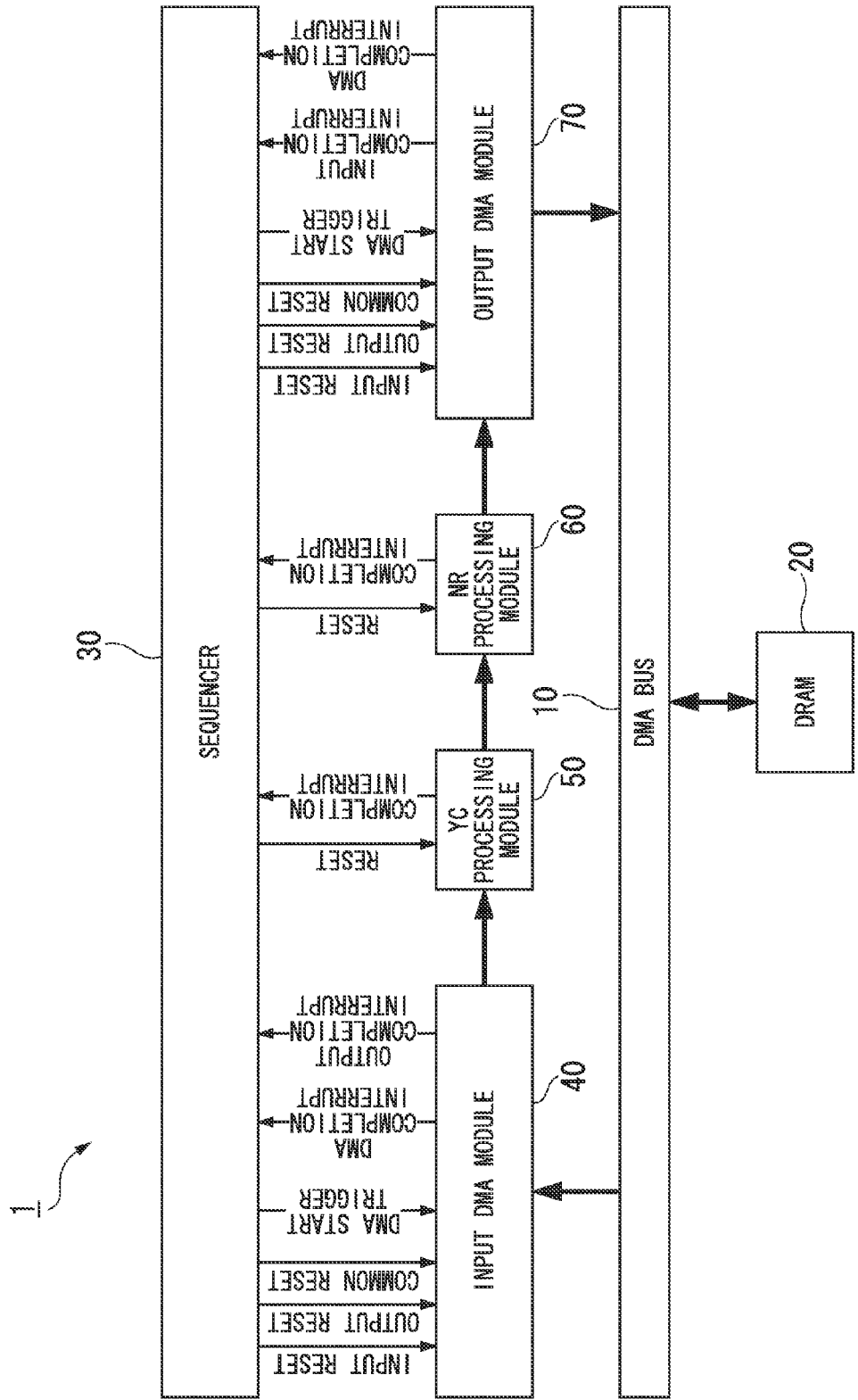
FIG. 1 is a block diagram illustrating a schematic configuration of an image processing apparatus in accordance with a first preferred embodiment of the present invention.

FIG. 1 is a block diagram illustrating a schematic configuration of an image processing apparatus in accordance with a first preferred embodiment of the present invention. The image processing apparatus 1 shown in FIG. 1 includes a DMA bus 10, a DRAM 20, a sequencer 30, an input DMA module 40, a YC processing module 50, an NR processing module 60, and an output DMA module 70. The image processing apparatus 1 of this embodiment may include, for example, an imaging apparatus such as a still-image camera.

Figure 9A:
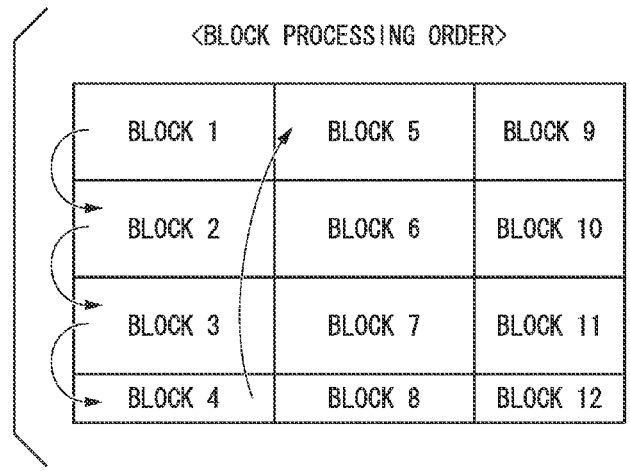
FIGS. 9A and 9B are diagrams illustrating another block division method in the pipeline process and timings of the pipeline, process in accordance with the related art.
Figure 9B:
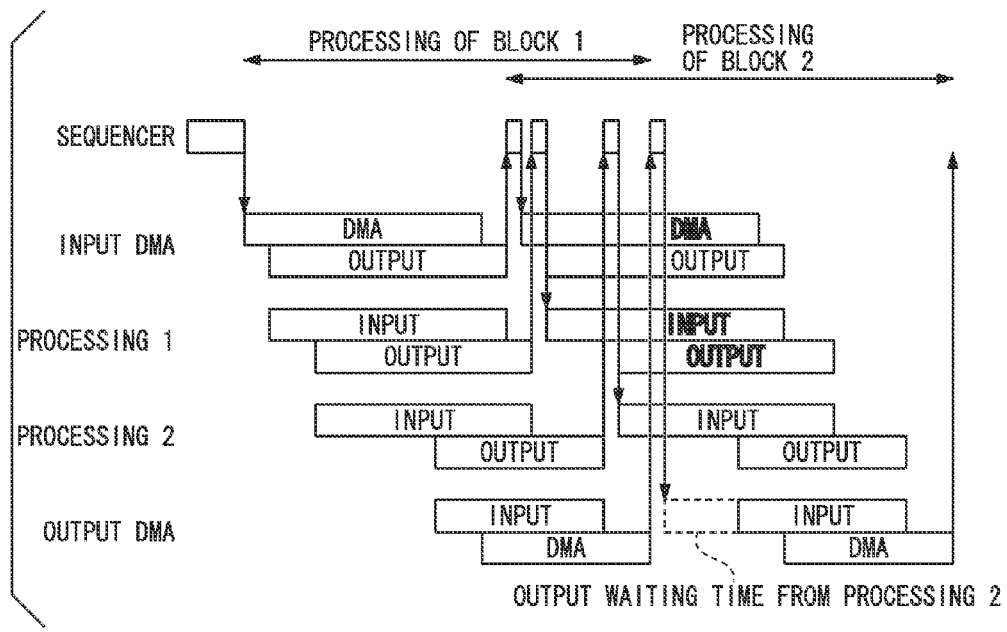
Figure 10A:
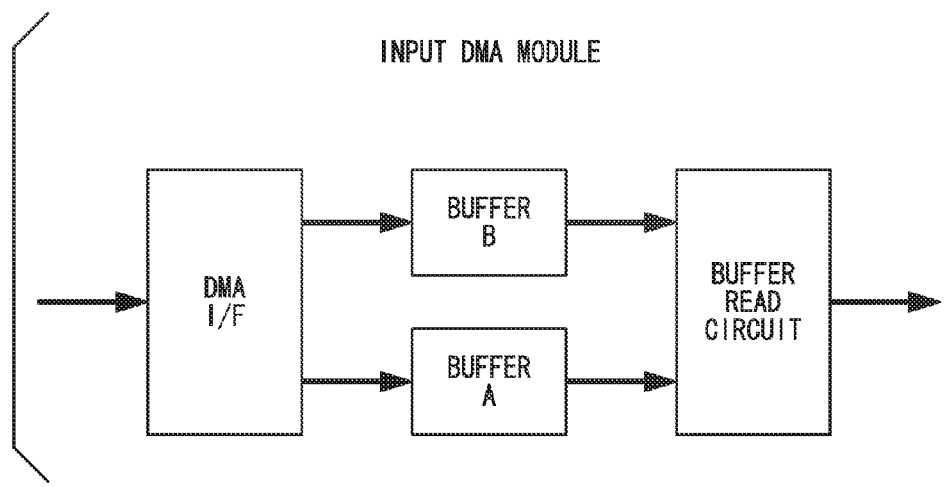
FIGS. 10A and 10B are block diagrams illustrating examples of schematic configurations of DMA modules in accordance with the related art.
Figure 10B:
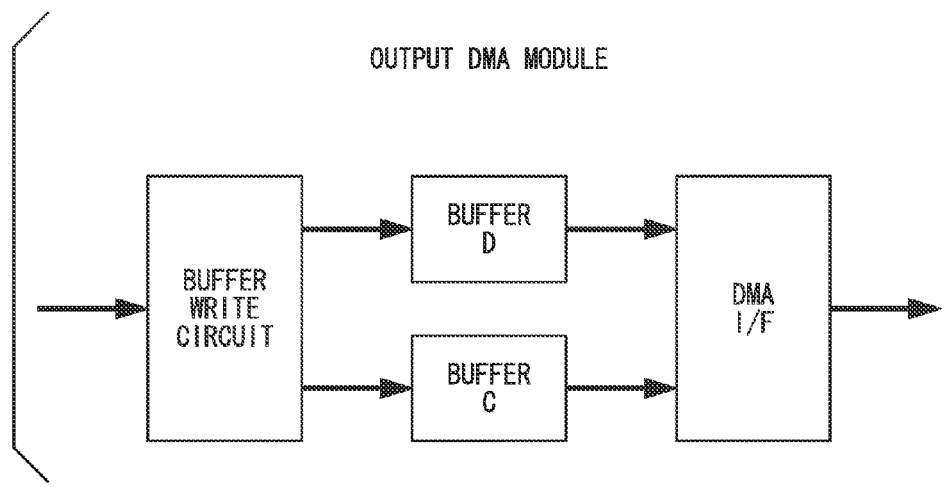
Figure 12A:
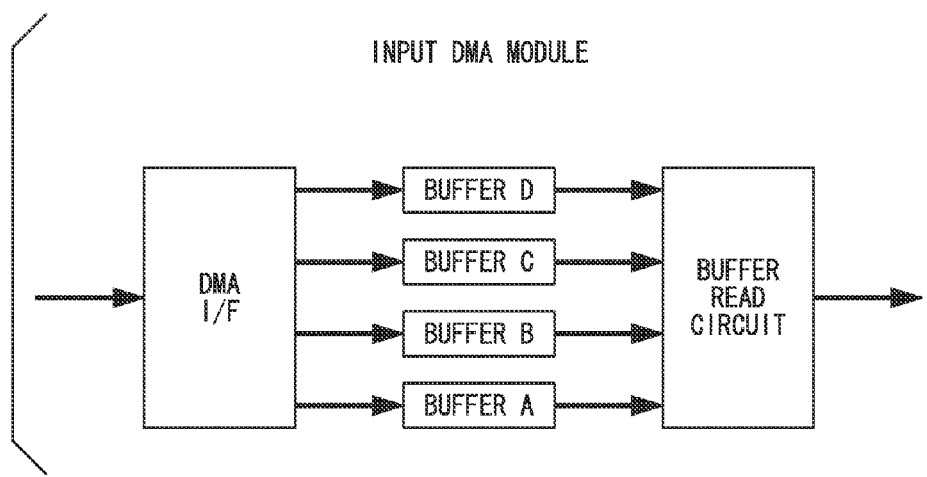
FIGS. 12A and 12B are block diagrams illustrating other examples of schematic configurations of DMA modules in accordance with the related art.
Figure 12B:
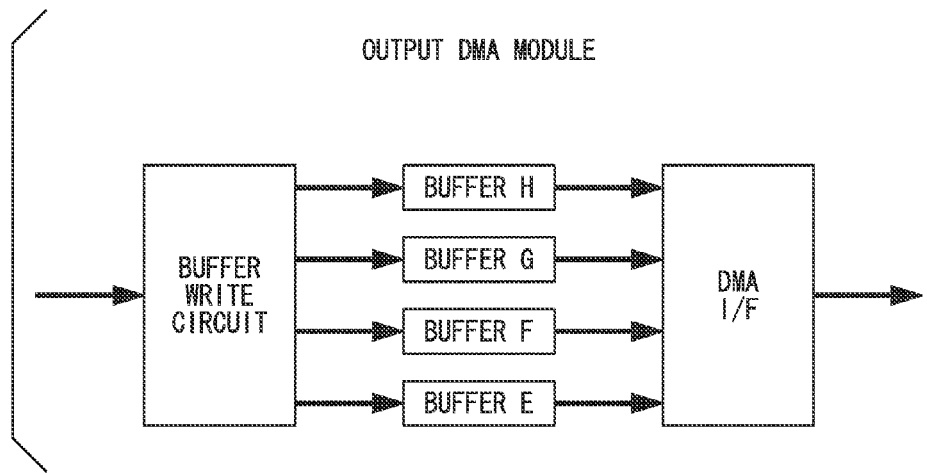

The DRAM 20 is connected to the DMA bus 10 and stores various data to be processed in the imaging apparatus. For example, data of a still image output from an imager (not shown) included in the imaging apparatus is stored. In the image processing apparatus 1 of this embodiment, the data of the still image of one frame stored in the DRAM 20 is divided into a plurality of small blocks, and image processing is performed for each block as shown in FIG. 9A. In the image processing apparatus 1 of this embodiment, image processing is sequentially performed in the respective processing modules by a pipeline process in which the input DMA module 40, the YC processing module 50, the NR processing module 60, and the output DMA module 70 are connected in series as shown in FIG. 1. In the following description, data included in each block into which data of a still image of one frame is divided is referred to as "block image data."

When the pipeline process of the image processing apparatus 1 of this embodiment is performed, the sequencer 30 controls a processing sequence of each processing module constituting a pipeline. The sequencer 30 outputs a control signal, which controls settings and a processing start corresponding to a block subjected to the pipeline process, to each processing module.

The input DMA module 40 is a processing module for reading block image data stored in the DRAM 20 and outputting the read block image data to the YC processing module 50, which is the next processing module constituting the pipeline. The input DMA module 40 reads block image data from the DRAM 20 via the DMA bus 10 in response to the control signal input from the sequencer 30, and temporarily stores the read block image data. The input DMA module 40 outputs the temporarily stored block image data to the YC processing module 50. The input DMA module 40 is controlled by the sequencer 30 for each input operation and each output operation on the block image data. In FIG. 1, a common reset signal, an input reset signal, an output reset signal, and a DMA start trigger signal input from the sequencer 30 and a DMA completion interrupt signal and an output completion interrupt signal output to the sequencer 30 are shown. The input DMA module 40 will be described in detail later.

The YC processing module 50 is a processing module for generating a Y (luminance) signal and a C (color) signal by performing various digital image processing operations on input block image data. The YC processing module 50 generates the Y signal and the C signal corresponding to the block image data input from the input DMA module 40 in response to a control signal input from the sequencer 30, and outputs the generated Y and C signals to the NR processing module 60.

The NR processing module 60 is a processing module for reducing noise included in the Y and the C signals by performing various digital image processing operations on the input Y and C signals. The NR processing module 60 reduces noise included in the Y and C signals input from the YC processing module 50 in response to the control signal input from the sequencer 30, and outputs the noise-reduced Y and C signals to the output DMA module 70. In the following description, the noise-reduced Y and C signals are referred to as "noise-reduced data."

The output DMA module 70 is a processing module for writing (or storing) the input noise-reduced data to the DRAM 20. The output DMA module 70 temporarily stores the noise-reduced data input from the NR processing module 60 in response to the control signal input from the sequencer 30. The output DMA module 70 outputs the temporarily stored noise-reduced data to the DRAM 20 via the DMA bus 10. The output DMA module 70 is controlled by the sequencer 30 for each input operation and each output operation on the noise-reduced data. In FIG. 1, a common reset signal, an input reset signal, an output reset signal, and a DMA start trigger signal input from the sequencer 30 and an input completion interrupt signal and a DMA completion interrupt signal output to the sequencer 30 are shown. The output DMA module 70 will be described in detail later.

As described above, the respective processing modules within the image processing apparatus 1 perform a series of image processing operations on blocks by sequentially performing the image processing operations corresponding to control signals output from the sequencer 30 for the blocks into which data of a still image of one frame is divided.

Figure 2A:
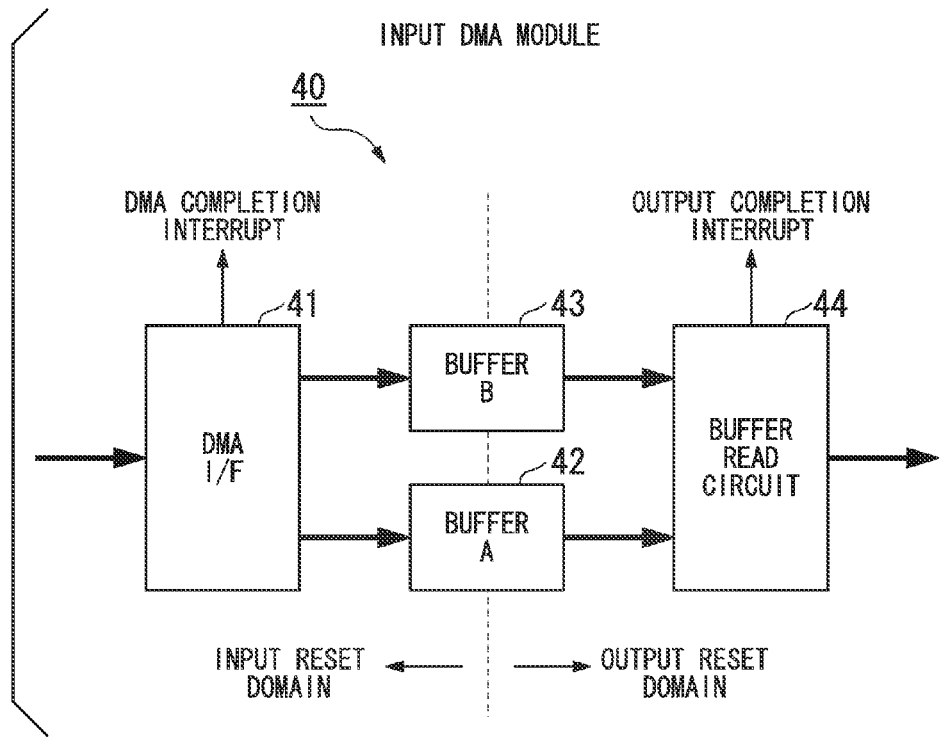
FIGS. 2A and 2B are block diagrams illustrating basic configurations of a DMA modules included in the image processing apparatus in accordance with the first preferred embodiment of the present invention.
Figure 2B:
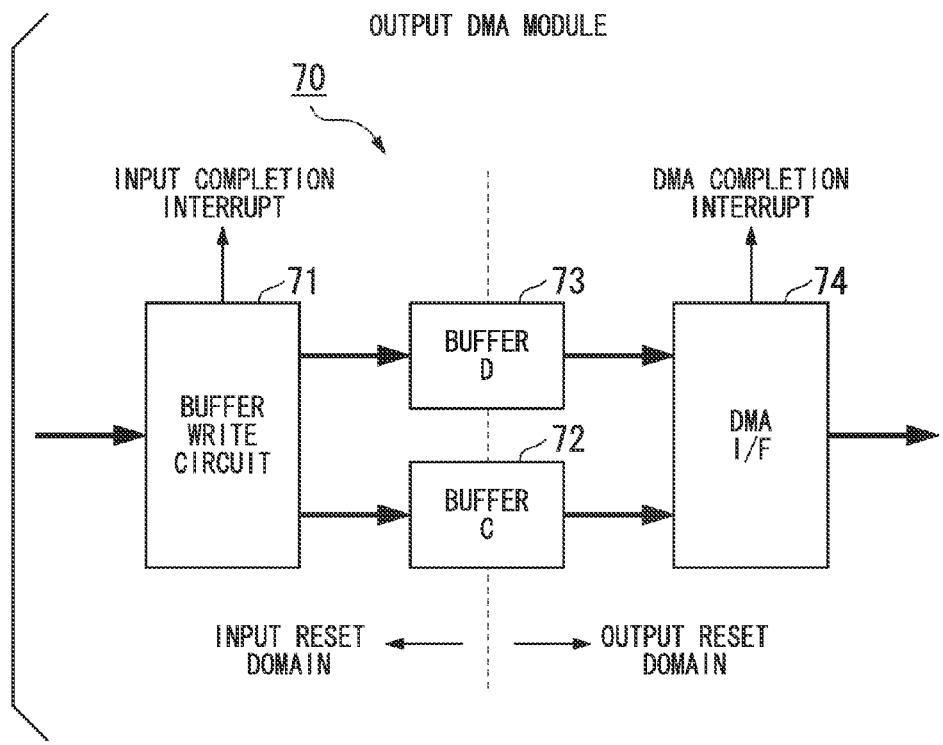

Next, the respective processing modules within the image processing apparatus 1 will be described. FIGS. 2A and 2B are block diagrams illustrating basic configurations of the DMA modules included in the image processing apparatus 1 in accordance with the first preferred embodiment of the present invention. FIG. 2A shows the basic configuration of the input DMA module 40, and FIG. 2B shows the basic configuration of the output DMA module 70.

As shown in FIG. 2A, the input DMA module 40 includes a DMA interface (I/F) 41, two buffers (buffer A (42) and buffer B (43)), and a buffer read circuit 44.

The buffer A (42) and the buffer B (43) are storage units, which temporarily store block image data.

The DMA I/F 41 reads block image data stored in the DRAM 20 via the DMA bus 10, and stores the read block image data in any one buffer of the buffer A (42) and the buffer B (43). When reading of the block image data stored in the DRAM 20 is completed, that is, when DMA transmission by the DMA I/F 41 is completed, the DMA I/F 41 outputs the DMA completion interrupt signal to the sequencer 30.

The buffer read circuit 44 reads the block image data stored in any one buffer of the buffer A (42) and the buffer B (43), and outputs the read block image data to the next processing module (the YC processing module 50 in this embodiment shown in FIG. 1) constituting the pipeline. When the outputting of the block image data to the next processing module is completed, the buffer read circuit 44 outputs the output completion interrupt signal to the sequencer 30.

The input DMA module 40 is a configuration including two buffers referred to as the buffer A (42) and the buffer B (43). Thereby, writing of the block image data to one buffer by the DMA I/F 41 and reading of the block image data from the other buffer by the buffer read circuit 44 are alternately switched, so that the block image data can be input and output in the same period. For example, the buffer read circuit 44 can read the block image data from the buffer B (43) and output the read block image data to the next processing module even when the DMA I/F 41 is writing the block image data to the buffer A (42). If the reading of the block image data from the buffer B (43) by the buffer read circuit 44 is completed when the DMA I/F 41 completes the writing of the block image data to the buffer A (42), the DMA I/F 41 can continuously write the block image data to the buffer B (43). At this time, because the writing of the block image data to the buffer A (42) is completed, the buffer read circuit 44 can continuously read the block image data from the buffer A (42) and output the read block image data to the next processing module.

In the basic configuration of the input DMA module 40, a control unit (hereinafter referred to as a "domain") to be reset is separated. More specifically, a reset domain (input reset domain) of a part for writing data to the buffer and a reset domain (output reset domain) of a part for reading data from the buffer are separated in two buffer positions. As described above, the input DMA module 40 respectively outputs the DMA completion interrupt signal indicating that DMA inputting of data by the DMA I/F 41 is completed and the output completion interrupt signal indicating that outputting of data to the next processing module by the buffer read circuit 44 is completed to the sequencer 30.

In the image processing apparatus 1 of this embodiment according to the above-described configuration, the sequencer 30 resets a domain (control unit) corresponding to an interrupt signal and resets settings corresponding to a block subjected to the pipeline process every time the interrupt signal (the DMA completion interrupt signal or the output completion interrupt signal) is input from the input DMA module 40 to the sequencer 30. Thereby, the input DMA module 40 can pre-read block image data of the next block from the DRAM 20 while outputting block image data of a previous block to the next processing module.

As shown in FIG. 2B, the output DMA module 70 includes a buffer write circuit 71, two buffers (a buffer C (72) and a buffer D (73)), and a DMA I/F 74.

The buffer C (72) and the buffer D (73) are storage units, which temporarily store noise-reduced data.

The buffer write circuit 71 stores noise-reduced data input from a previous processing module (the NR processing module 60 in this embodiment shown in FIG. 1) constituting the pipeline in any one buffer of the buffer C (72) and the buffer D (73). When inputting of the noise-reduced data from the previous processing module is completed, the buffer write circuit 71 outputs the input completion interrupt signal to the sequencer 30.

The DMA I/F 74 reads the noise-reduced data stored in any one buffer of the buffer C (72) and the buffer D (73), and outputs the read noise-reduced data to the DRAM 20 via the DMA bus 10. When the outputting of the noise-reduced data to the DRAM 20 is completed, that is, when DMA transmission by the DMA I/F 74 is completed, the DMA I/F 74 outputs the DMA completion interrupt signal to the sequencer 30.

Like the input DMA module 40, the output DMA module 70 is a configuration including the two buffers referred to as the buffer C (72) and the buffer D (73). Thereby, writing of the noise-reduced data to one buffer by the buffer write circuit 71 and reading of the noise-reduced data from the other buffer by the DMA I/F 74 are alternately switched, so that the noise-reduced data can be input and output in the same period. For example, the DMA I/F 74 can read the noise-reduced data from the buffer D (73) and output the read noise-reduced data to the DRAM 20 via the DMA bus 10 even when the buffer write circuit 71 is writing the noise-reduced data to the buffer C (72). If the outputting of the noise-reduced data from the buffer D (73) to the DRAM 20 by the DMA I/F 74 is completed when buffer write circuit 71 completes the writing of the noise-reduced data to the buffer C (72), the buffer write circuit 71 can continuously write the noise-reduced data to the buffer D (73). At this time, because the writing of the noise-reduced data to the buffer C (72) is completed, the DMA I/F 74 can continuously read the noise-reduced data from the buffer C (72) and output the read noise-reduced data to the DRAM 20.

In the basic configuration of the output DMA module 70, like the input DMA module 40, a control unit (hereinafter referred to as a "domain") to be reset is separated. More specifically, a reset domain (input reset domain) of a part for writing data to the buffer and a reset domain (output reset domain) of a part for reading data from the buffer are separated in two buffer positions. As described above, the output DMA module 70 respectively outputs the input completion interrupt signal indicating that an input from a previous module by the buffer write circuit 71 is completed and the DMA completion interrupt signal indicating that DMA outputting of data by the DMA I/F 74 is completed to the sequencer 30.

In the image processing apparatus 1 of this embodiment according to the above-described configuration, the sequencer 30 resets a domain (control unit) corresponding to an interrupt signal and resets settings corresponding to a block subjected to the pipeline process every time the interrupt signal (the input completion interrupt signal or the DMA completion interrupt signal) is input from the output DMA module 70 to the sequencer 30. Thereby, the output DMA module 70 can pre-write noise-reduced data of the next block from the previous processing module while outputting noise-reduced data of a previous block to the DRAM 20.

Figure 3:
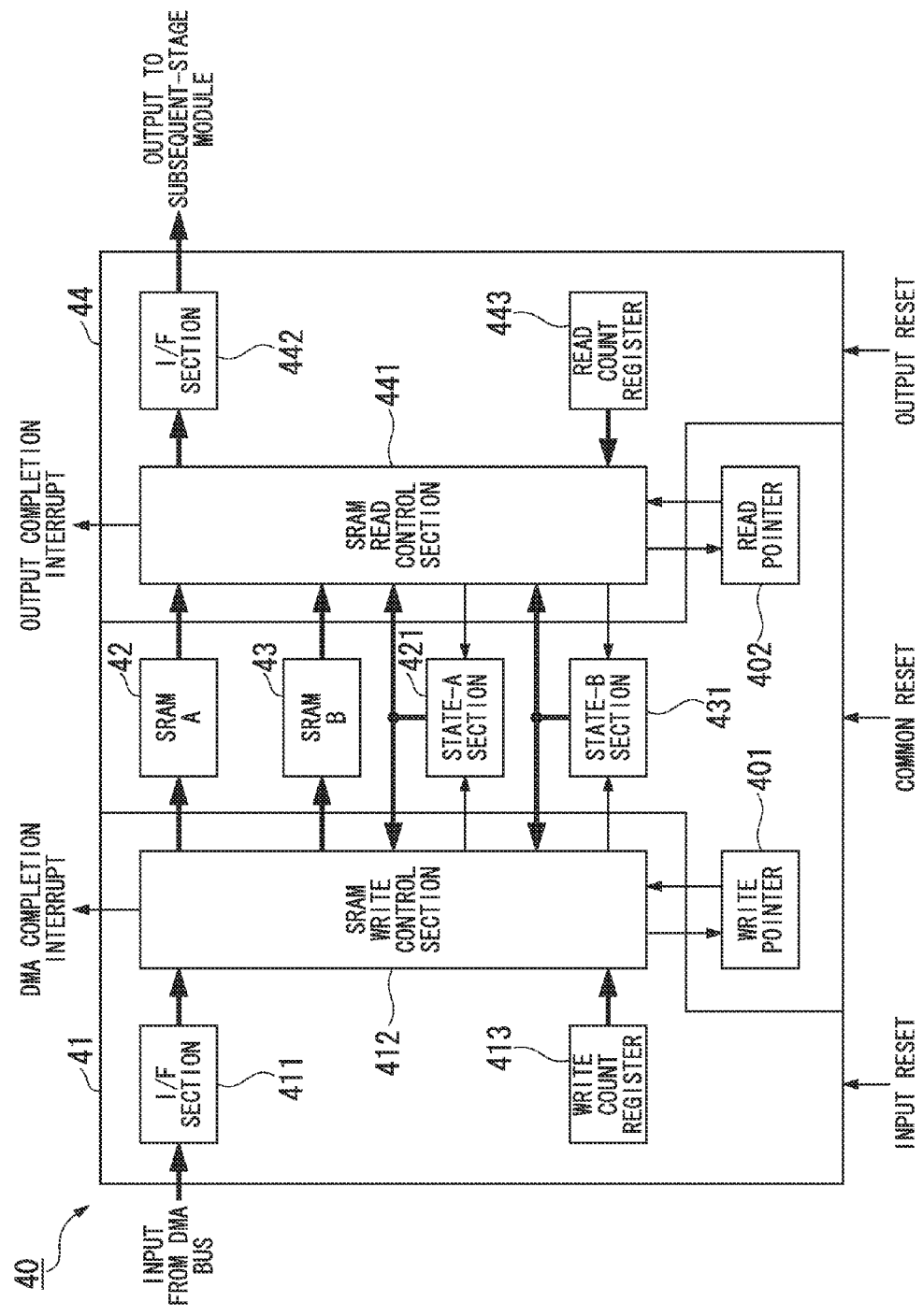
FIG. 3 is a block diagram illustrating a schematic configuration of an input DMA module in accordance with the first preferred embodiment of the present invention.

Next, the input DMA module 40 and the output DMA module 70 will be described in detail. First, the configuration of the input DMA module 40 will be described. FIG. 3 is a block diagram illustrating a schematic configuration of the input DMA module 40 in accordance with the first preferred embodiment of the present invention. In FIG. 3, an example in which each of the buffer A (42) and the buffer B (43) shown in FIG. 2A is constituted by a static random access memory (SRAM) is shown. In the following description, the buffer A (42) and the buffer B (43) are also referred to as SRAM_A 42 and SRAM_B 43, respectively.

As shown in FIG. 3, the input DMA module 40 includes a state-A unit 421, a state-B unit 431, a write pointer 401, and a read pointer 402. The input DMA module 40 includes an I/F unit 411, an SRAM write control unit 412, and a write count register 413 as the DMA I/F 41. The input DMA module 40 includes an SRAM read control unit 441, an I/F unit 442, and a read count register 443 as the buffer read circuit 44.

The state-A unit 421 retains information indicating whether the corresponding SRAM_A 42 is in a writable state or a readable state. Like the state-A unit 421, the state-B unit 431 retains information indicating whether the corresponding SRAM_B 43 is in the writable state or the readable state. The writable state of the SRAM in the state-A unit 421 and the state-B unit 431 is a state in which no valid data is stored in the SRAM and writing of data is accepted. The readable state of the SRAM in the state-A unit 421 and the state-B unit 431 is a state in which all valid data is stored in the SRAM and reading of data is accepted.

The write pointer 401 retains information indicating whether an SRAM to which the SRAM write control unit 412 writes data is SRAM_A 42 or SRAM_B 43. The read pointer 402 retains information indicating whether an SRAM from which the SRAM read control unit 441 reads data is SRAM_A 42 or SRAM_B 43.

The state-A unit 421, the state-B unit 431, the write pointer 401, and the read pointer 402 are initialized by the common reset signal input from the sequencer 30. If the initialization is performed by an input of the common reset signal from the sequencer 30, the state-A unit 421 and the state-B unit 431 together indicate that SRAM_A 42 and SRAM_B 43 are in the writable state, and the write pointer 401 and the read pointer 402 together point to SRAM_A 42.

The I/F unit 411 starts DMA in response to the DMA start trigger signal input from the sequencer 30, and reads block image data stored in the DRAM 20. Block image data read by the I/F unit 411 is output to the SRAM write control unit 412.

The SRAM write control unit 412 writes block image data input from the I/F unit 411 to any one SRAM of SRAM_A 42 and SRAM_B 43. The SRAM to which the SRAM write control unit 412 writes block image data is determined in response to information of the state-A unit 421, the state-B unit 431, and the write pointer 401. An operation of the input DMA module 40 including the SRAM write control unit 412 will be described in detail later.

In the write count register 413, the number of data of a corresponding block to be subjected to the pipeline process is set by the sequencer 30. The number of data set in the write count register 413 corresponds to the number of times of writing to the SRAM by reading from the DRAM 20 in a corresponding block. The SRAM write control unit 412 compares the number of times set in the write count register 413 with the number of times of writing to the SRAM, and outputs the DMA completion interrupt signal to the sequencer 30 to stop writing of block image data to the SRAM if they are consistent.

In the I/F unit 411, the SRAM write control unit 412, and the write count register 413, each operation state is initialized by the input reset signal input from the sequencer 30.

The I/F unit 442 outputs block image data input from the SRAM read control unit 441 in response to a data request signal from the subsequent-stage YC processing module 50 constituting the pipeline within the image processing apparatus 1 of this embodiment.

The SRAM read control unit 441 reads block image data stored in any one SRAM of SRAM_A 42 and SRAM_B 43, and outputs the read block image data to the I/F unit 442. The SRAM from which the SRAM read control unit 441 reads block image data is determined in response to information of the state-A unit 421, the state-B unit 431, and the read pointer 402. An operation of the input DMA module 40 including the SRAM read control unit 441 will be described in detail later.

In the read count register 443, the number of data of a corresponding block to be subjected to the pipeline process is set by the sequencer 30. The number of data set in the read count register 443 corresponds to the number of times of reading block image data, to be output to the subsequent-stage YC processing module 50 in a corresponding block, from the SRAM. The SRAM read control unit 441 compares the number of times set in the read count register 443 with the number of times of reading from the SRAM, and outputs the output completion interrupt signal to the sequencer 30 to stop reading of block image data from the SRAM if they are consistent.

In the SRAM read control unit 441, the I/F unit 442, and the read count register 443, each operation state is initialized by the output reset signal input from the sequencer 30.

Figure 4:
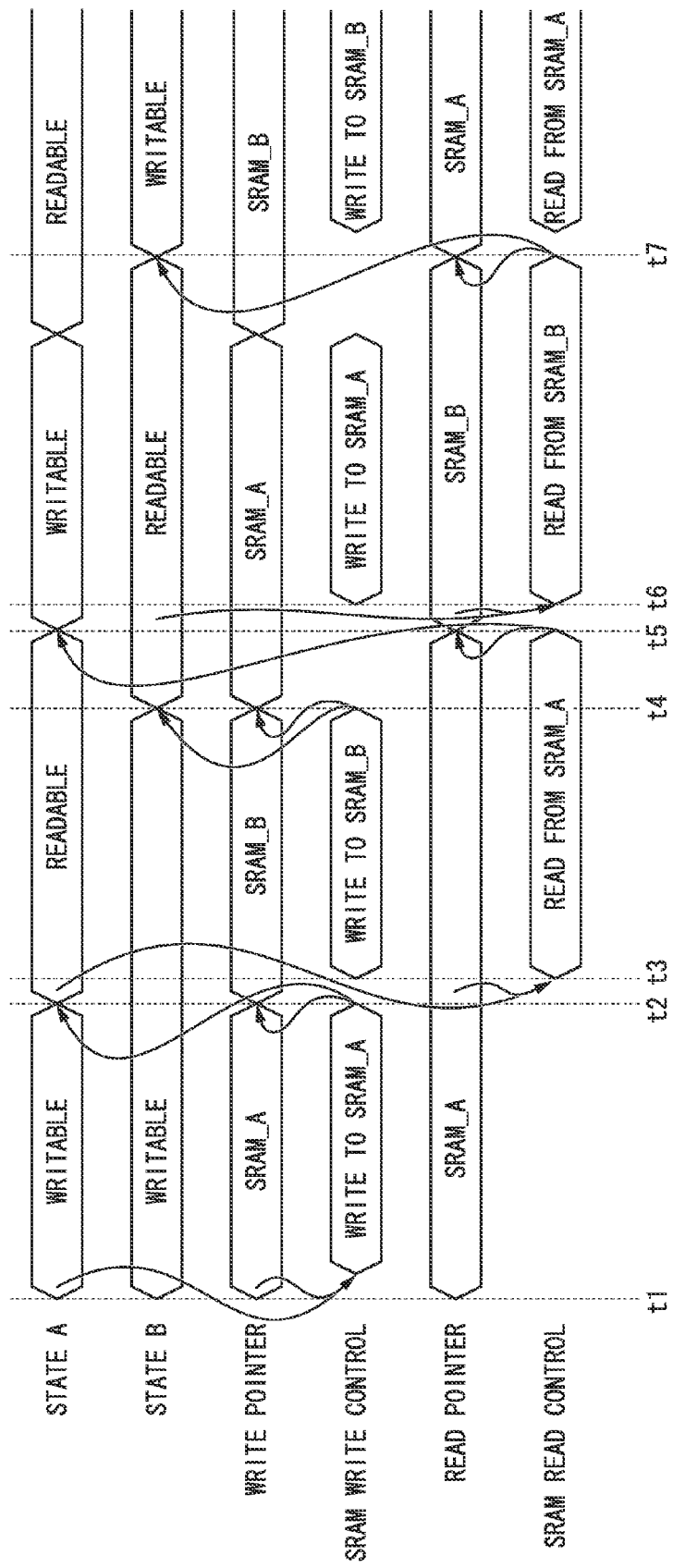
FIG. 4 is a timing chart illustrating buffer control timings in the input DMA module in accordance with the first preferred embodiment of the present invention.

Here, an operation of the input DMA module 40 shown in FIG. 3 will be described. FIG. 4 is a timing chart illustrating buffer (SRAM) control timings in the input DMA module 40 in accordance with the first preferred embodiment of the present invention. In the following description, an operation after the state-A unit 421, the state-B unit 431, the write pointer 401, and the read pointer 402 are initialized by the common reset signal input from the sequencer 30 will be described.

First, an operation of inputting block image data to the input DMA module 40 will be described. When the DMA start trigger signal is input from the sequencer 30 and an input operation of the input DMA module 40 is started, the I/F unit 411 reads block image data stored in the DRAM 20 by DMA and outputs the read block image data to the SRAM write control unit 412. Thereafter, the SRAM write control unit 412 checks information of the write pointer 401 at a timing t1. At this time, because the information of the write pointer 401 points to SRAM_A 42, the SRAM write control unit 412 continuously checks information of the state-A unit 421. At this time, because the state-A unit 421 indicates the writable state, the SRAM write control unit 412 starts writing of block image data input from the I/F unit 411 to SRAM_A 42.

Thereafter, when the writing of the block image data to SRAM_A 42 by the SRAM write control unit 412 is completed (for example, when writing of data to all storage areas of SRAM_A 42 is completed), the SRAM write control unit 412 changes information of the write pointer 401 to information indicating SRAM_B 43 at a timing t2. The SRAM write control unit 412 changes the information of the state-A unit 421 to information indicating the readable state.

Thereafter, the SRAM write control unit 412 checks information of the write pointer 401 at a timing t3. At this time, because the information of the write pointer 401 is changed to information indicating SRAM_B 43 at the timing t2, the SRAM write control unit 412 continuously checks information of the state-B unit 431. At this time, because the state-B unit 431 indicates the writable state, the SRAM write control unit 412 continuously writes block image data input from the I/F unit 411 to SRAM_B 43.

Thereafter, when the writing of the block image data to SRAM_B 43 by the SRAM write control unit 412 is completed, the SRAM write control unit 412 changes information of the write pointer 401 to information indicating SRAM_A 42 at a timing t4, and further changes the information of the state-B unit 431 to information indicating the readable state.

Hereinafter, likewise, the SRAM write control unit 412 checks the information of the write pointer 401, checks information of the state-A unit 421 or the state-B unit 431 corresponding to SRAM_A 42 or SRAM_B 43 pointed to by the information of the write pointer 401, and iterates writing of block image data to a corresponding SRAM. In the input DMA module 40 as described above, the SRAM write control unit 412 alternately writes block image data to the SRAM having the writable state, thereby writing all block image data input from the I/F unit 411 to the SRAM.

When the information of the state-A unit 421 or the state-B unit 431 corresponding to an SRAM pointed to by the information of the write pointer 401 does not indicate the writable state, writing of block image data to the SRAM by the SRAM write control unit 412 waits. When the information of the state-A unit 421 or the state-B unit 431 corresponding to the SRAM pointed to by the information of the write pointer 401 indicates the writable state, the writing of the block image data to the SRAM by the SRAM write control unit 412 is resumed.

When the writing of the block image data to the SRAM according to the number of times set in the write count register 413 is completed, the SRAM write control unit 412 changes the information of the write pointer 401 and the information of the state-A unit 421 or the state-B unit 431 corresponding to the SRAM to which block image data is written, and further outputs the DMA completion interrupt signal to the sequencer 30.

On the other hand, an operation of outputting block image data from the input DMA module 40 is performed as follows.

When an operation of the subsequent-stage YC processing module 50 is started by the sequencer 30, a data request signal from the YC processing module 50 is input to the input DMA module 40. In response to the data request signal, the SRAM read control unit 441 starts reading from the SRAM. First, the SRAM read control unit 441 checks information of the read pointer 402. At this time, because the information of the read pointer 402 points to SRAM_A 42, the SRAM read control unit 441 continuously checks information of the state-A unit 421. At this time, when the information of the state-A unit 421 does not indicate the writable state, reading of block image data from the SRAM_A 42 by the SRAM read control unit 441 waits. In the timing chart shown in FIG. 4, the state-A unit 421 indicates the readable state at the timing t3. Accordingly, the reading of the block image data from SRAM_A 42 by the SRAM read control unit 441 is started from the timing t3. The SRAM read control unit 441 outputs the block image data read from SRAM_A 42 to the I/F unit 442. Thereby, the I/F unit 442 outputs block image data corresponding to the data request signal from the YC processing module 50 to the YC processing module 50.

Thereafter, when the reading of the block image data from SRAM_A 42 by the SRAM read control unit 441 is completed (for example, when reading of data from all storage areas of SRAM_A 42 is completed), the SRAM read control unit 441 changes information of the read pointer 402 to information indicating SRAM_B 43 at a timing t5. The SRAM read control unit 441 changes the information of the state-A unit 421 to information indicating the writable state.

Thereafter, the SRAM read control unit 441 checks the information of the read pointer 402 at a timing t6. At this time, because the information of the read pointer 402 is changed to information indicating SRAM_B 43 at the timing t5, the SRAM read control unit 441 continuously checks information of the state-B unit 431. At this time, because the information of the state-B unit 431 is changed to the readable state by the SRAM write control unit 412 at the timing t4, the SRAM read control unit 441 continuously reads block image data from SRAM_B 43.

Thereafter, when the reading of the block image data from SRAM_B 43 by the SRAM read control unit 441 is completed, the SRAM read control unit 441 changes the information of the read pointer 402 to information indicating SRAM_A 42 at a timing t7, and further changes the information of the state-B unit 431 to information indicating the writable state.

Likewise, the SRAM read control unit 441 checks the information of the read pointer 402 and iteratively checks the information of the state-A unit 421 or the state-B unit 431 corresponding to SRAM_A 42 or SRAM_B 43 pointed to by the information of the read pointer 402. In the input DMA module 40 as described above, the SRAM read control unit 441 alternately reads block image data from the SRAM having the readable state, thereby outputting all block image data requested from the YC processing module 50 to the YC processing module 50.

As described above, when the information of the state-A unit 421 or the state-B unit 431 corresponding to an SRAM pointed to by the information of the read pointer 402 does not indicate the readable state, the reading of the block image data from the SRAM by the SRAM read control unit 441 waits. When the information of the state-A unit 421 or the state-B unit 431 corresponding to the SRAM pointed to by the information of the read pointer 402 indicates the readable state, the reading of the block image data from the SRAM by the SRAM read control unit 441 is resumed.

When the reading of the block image data from the SRAM according to the number of times set to the read count register 443 is completed, that is, when the outputting of all the block image data requested from the subsequent-stage YC processing module 50 is completed, the SRAM read control unit 441 changes the information of the read pointer 402 and the information of the state-A unit 421 or the state-B unit 431 corresponding to the SRAM from which the block image data is read, and further outputs the output completion interrupt signal to the sequencer 30.

Figure 5:
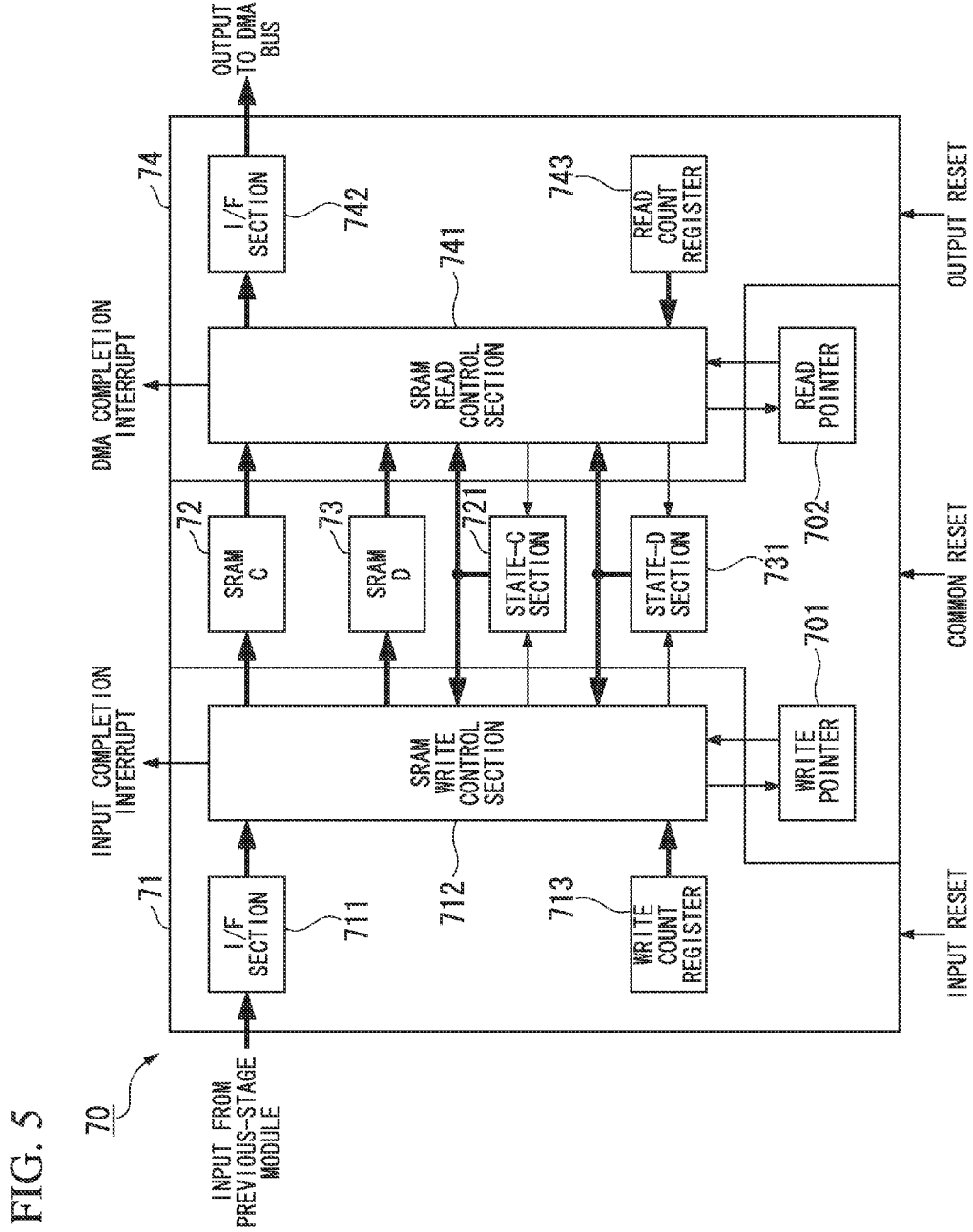
FIG. 5 is a block diagram illustrating a schematic configuration of an output DMA module in accordance with the first preferred embodiment of the present invention.

Next, the configuration of the output DMA module 70 will be described. FIG. 5 is a block diagram illustrating a schematic configuration of the output DMA module 70 in accordance with the first preferred embodiment of the present invention. In FIG. 5, an example in which each of the buffer C (72) and the buffer D (73) shown in FIG. 2B is constituted by an SRAM is shown. In the following description, the buffer C (72) and the buffer D (73) are also referred to as SRAM_C 72 and SRAM_D 73, respectively.

As shown in FIG. 5, the output DMA module 70 includes a state-C unit 721, a state-D unit 731, a write pointer 701, and a read pointer 702. The output DMA module 70 includes an I/F unit 711, an SRAM write control unit 712, and a write count register 713 as a buffer write circuit 71. The output DMA module 70 includes an SRAM read control unit 741, an I/F unit 742, and a read count register 743 as a DMA I/F 74.

In the output DMA module 70 shown in FIG. 5, input/output data is replaced with noise-reduced data (Y and C signals after noise reduction) from block image data in the input DMA module 40 shown in FIG. 3. A data input source is changed from the DRAM 20 to the previous-stage NR processing module 60, and a data output destination is changed to the DRAM 20. However, because an operation of each component within the output DMA module 70 is substantially the same as that of each component within the input DMA module 40 shown in FIG. 3, only a difference between the operations will be described hereinafter.

Like the state-A unit 421 and the state-B unit 431 included in the input DMA module 40 shown in FIG. 3, the state-C unit 721 and the state-D unit 731 retain information indicating whether SRAM_C 72 and SRAM_D 73 are in the writable state or the readable state. The writable state and the readable state of the SRAM in the state-C unit 721 and the state-D unit 731 are respectively the same as those in the state-A unit 421 and the state-C unit 431 shown in FIG. 3.

Like the write pointer 401 shown in FIG. 3, the write pointer 701 retains information indicating whether an SRAM to which the SRAM write control unit 712 writes data is SRAM_C 72 or SRAM_D 73. Like the read pointer 402 shown in FIG. 3, the read pointer 702 retains information indicating whether an SRAM from which the SRAM read control unit 741 reads data is SRAM_C 72 or SRAM_D 73.

As in the input DMA module 40 shown in FIG. 3, the state-C unit 721, the state-D unit 731, the write pointer 701, and the read pointer 702 are initialized by the common reset signal input from the sequencer 30. If the initialization is performed by an input of the common reset signal from the sequencer 30, the state-C unit 721 and the state-D unit 731 together indicate that SRAM_C 72 and SRAM_D 73 are in the writable state, and the write pointer 701 and the read pointer 702 together point to SRAM_C 72.

The I/F unit 711 outputs noise-reduced data input from the NR processing module 60 to the SRAM write control unit 712 in response to a data output request signal from the previous-stage NR processing module 60 constituting the pipeline within the image processing apparatus 1 of this embodiment.

Like the SRAM write control unit 412 shown in FIG. 3, the SRAM write control unit 712 writes the noise-reduced data input from the I/F unit 711 to any one SRAM of SRAM_C 72 and SRAM_D 73. The SRAM to which the SRAM write control unit 712 writes the noise-reduced data is determined in response to information of the state-C unit 721, the state-D unit 731, and the write pointer 701.

In the write count register 713, like the write count register 413 shown in FIG. 3, the number of data of a corresponding block to be subjected to the pipeline process is set by the sequencer 30. The number of data set in the write count register 713 corresponds to the number of times of writing noise-reduced data output from the previous-stage NR processing module 60 to the SRAM in a corresponding block. The SRAM write control unit 712 compares the number of times set in the write count register 713 with the number of times of writing to the SRAM, and outputs the input completion interrupt signal to the sequencer 30 to stop writing of noise-reduced data to the SRAM if they are consistent.

In the I/F unit 711, the SRAM write control unit 712, and the write count register 713, each operation state is initialized by the input reset signal input from the sequencer 30 as in the input DMA module 40 shown in FIG. 3.

The I/F unit 742 starts DMA in response to the DMA start trigger signal input from the sequencer 30, and outputs noise-reduced data read by the SRAM read control unit 741 to the DRAM 20 via the DMA bus 10.

Like the SRAM read control unit 441 shown in FIG. 3, the SRAM read control unit 741 reads noise-reduced data stored in any one SRAM of SRAMS 72 and SRAM_D 73, and outputs the read noise-reduced data to the I/F unit 742. The SRAM from which the SRAM read control unit 741 reads the noise-reduced data is determined in response to information of the state-C unit 721, the state-D unit 731, and the read pointer 702.

In the read count register 743, like the read count register 443 shown in FIG. 3, the number of data of a corresponding block to be subjected to the pipeline process is set by the sequencer 30. The number of data set in the read count register 743 corresponds to the number of times of reading noise-reduced data, to be output to the DRAM 20 in a corresponding block, from the SRAM. The SRAM read control unit 741 compares the number of times set in the read count register 743 with the number of times of reading from the SRAM, and outputs the DMA completion interrupt signal to the sequencer 30 to stop reading of noise-reduced data from the SRAM if they are consistent.

In the SRAM read control unit 741, the I/F unit 742, and the read count register 743, each operation state is initialized by the output reset signal input from the sequencer 30 as in the DMA module 40 shown in FIG. 3.

An operation of the output DMA module 70 shown in FIG. 5 is substantially the same as that of the input DMA module 40 shown in FIG. 3 as described above. Accordingly, a buffer (SRAM) control timing in the output DMA module 70 may be the same as a buffer (SRAM) control timing in the input DMA module 40 shown in FIG. 4. More specifically, an operation of inputting noise-reduced data to the output DMA module 70 is started in response to a data output request signal from the NR processing module 60, and an operation of outputting noise-reduced data from the output DMA module 70 is started in response to the DMA start trigger signal from the sequencer 30. Accordingly, a detailed description of a buffer (SRAM) control timing in the output DMA module 70 shown in FIG. 5 is omitted.

Figure 6:
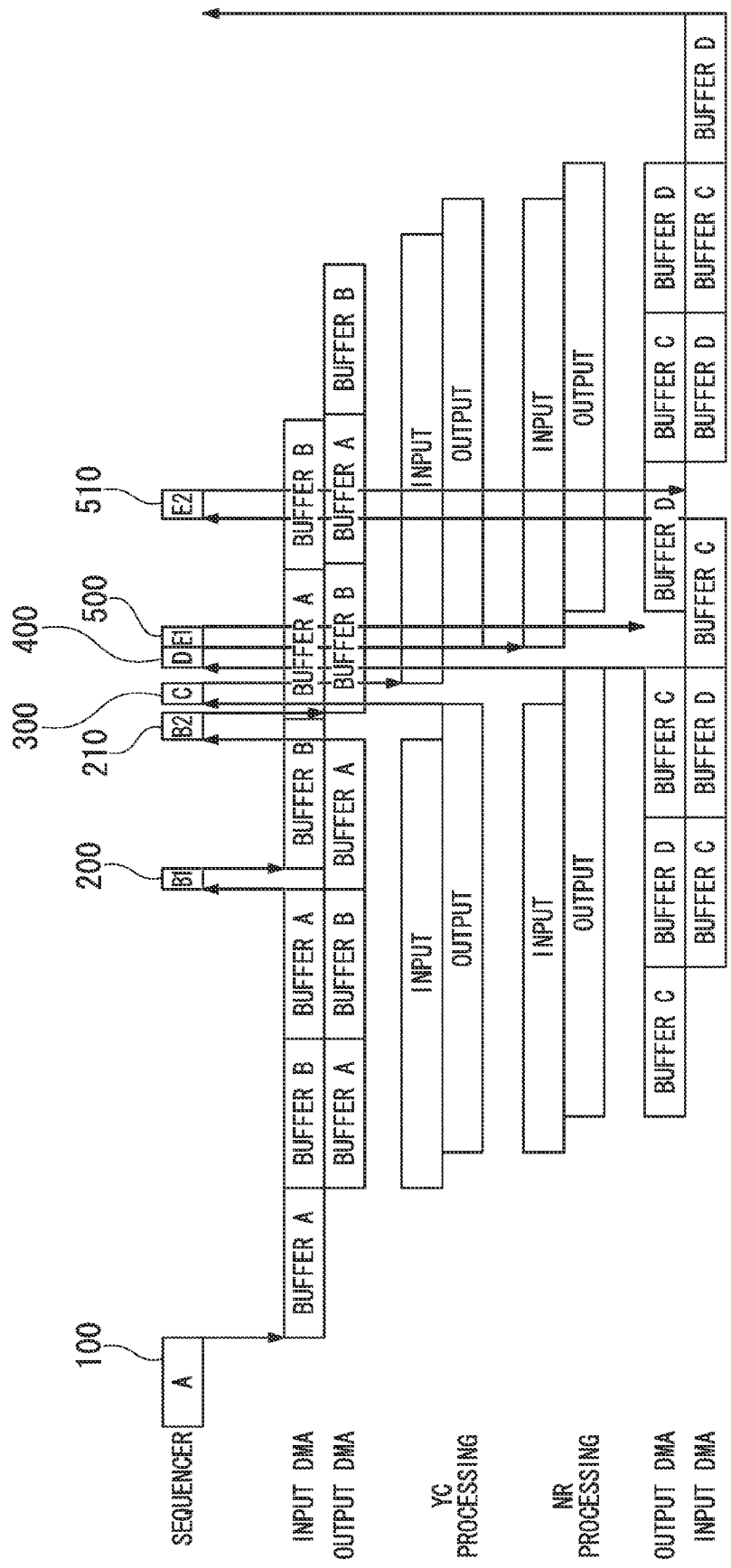
FIG. 6 is a diagram illustrating timings of a pipeline process of a pipeline process in the image processing apparatus in accordance with the first preferred embodiment of the present invention.
Figure 7:
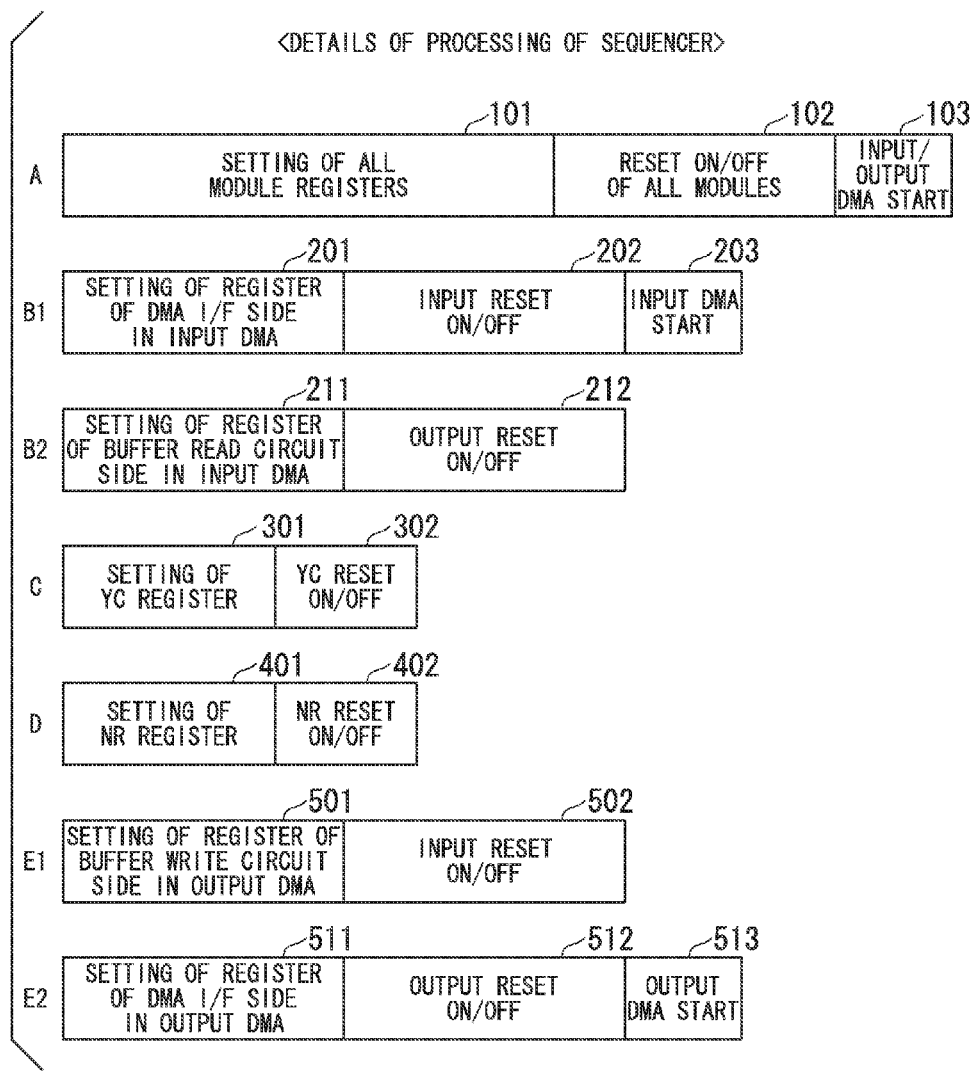
FIG. 7 is a diagram illustrating an example of a processing content of the pipeline process in the image processing apparatus in accordance with the first preferred embodiment of the present invention.
Figure 8A:
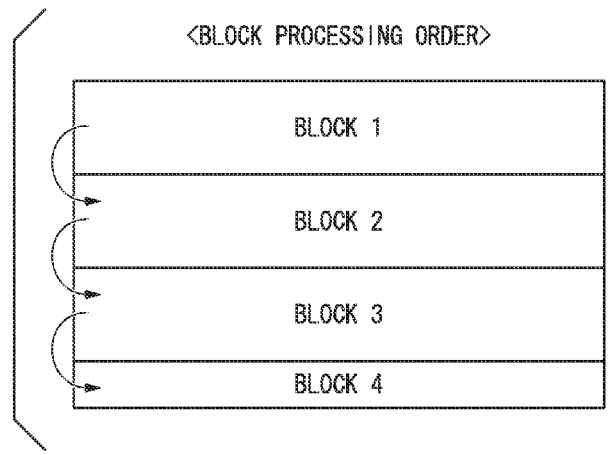
FIGS. 8A, 8B, and 8C are diagrams illustrating a block division method in a pipeline process and timings of the pipeline process in accordance with the related art.
Figure 8B:
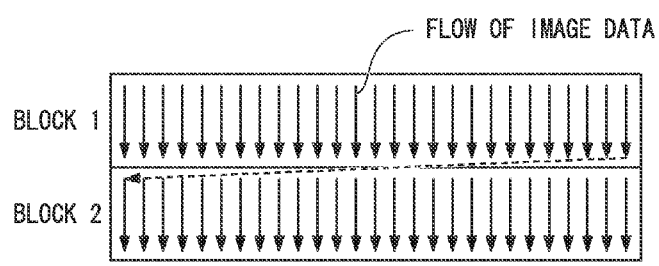
Figure 8C:
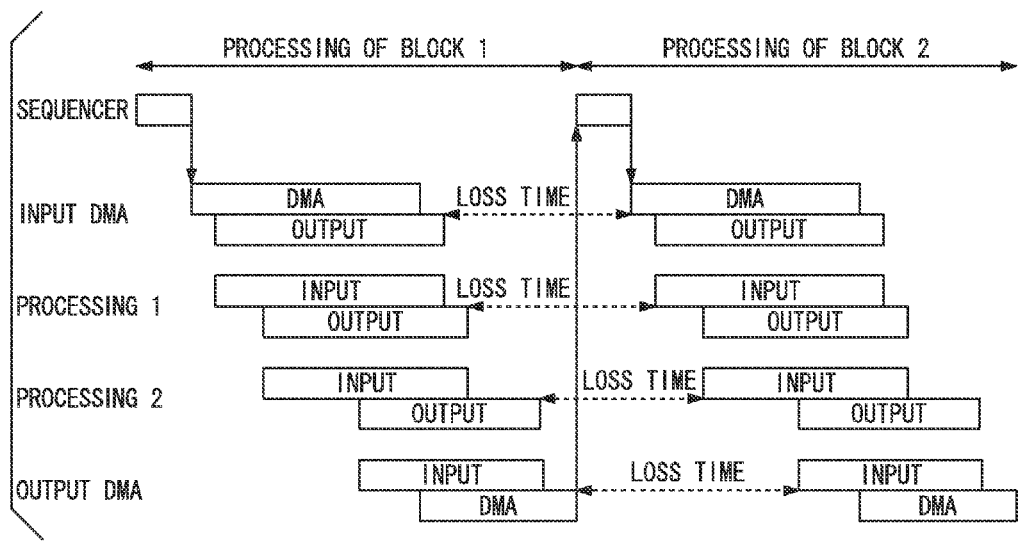

Next, processing content of the pipeline process to be performed by the sequencer 30 within the image processing apparatus 1 of this embodiment will be described. FIGS. 6 and 7 are diagrams illustrating examples of timings of the pipeline process and processing content of the pipeline process in the image processing apparatus 1 in accordance with the first preferred embodiment of the present invention. FIG. 6 shows timings of the pipeline process when data of a still image of one frame is divided into two blocks. FIG. 7 shows content of processing to be performed by the, sequencer 30 for each processing module in the pipeline process. In FIG. 6, an example in which a data amount of image data of one block is a data amount for three buffers included in the input DMA module 40 and the output DMA module 70 will be described. The timings of the pipeline process will be described with reference to FIG. 6, and the processing content of the sequencer 30 will be described with reference to FIG. 7.

If the image processing apparatus 1 starts image processing for data of a still image of one frame stored in the DRAM 20, the sequencer 30 first performs processing 100. In the processing 100, the sequencer 30 first performs register settings such as necessary parameters or the number of input/output data when image processing for block image data is performed for all processing modules (the input DMA module 40, the YC processing module 50, the NR processing module 60, and the output DMA module 70) constituting the pipeline in processing 101. For example, the number of times of writing to and reading from the buffer is set in the write count register 413 and the read count register 443 within the input DMA module 40 and the write count register 713 and the read count register 743 within the output DMA module 70.

Subsequently, the sequencer 30 initializes (or resets) operation states of all the processing modules in processing 102. In the reset of the processing modules, the sequencer 30 outputs the common reset signal, the input reset signal, and the output reset signal to the input DMA module 40 and the output DMA module 70, and outputs the reset signal to the YC processing module 50 and the NR processing module 60. Thereafter, the sequencer 30 releases the reset. Thereby, each processing module is in a state in which each processing can be started.

Subsequently, the sequencer 30 outputs the DMA start trigger signal to the input DMA module 40 and the output DMA module 70 in processing 103. Thereby, the input DMA module 40 starts reading of image data of a first block (hereinafter referred to as "first block image data") from the DRAM 20 by DMA. Because there is no noise-reduced data to be output to the DRAM 20 by the DMA in the output DMA module 70, the DMA by the output DMA module 70 is in a waiting state.

Thereafter, when writing of the first block image data to the buffer A (42) within the input DMA module 40 is completed, the input DMA module 40 reads the first block image data from the buffer A (42) and outputs the read first block image data to the YC processing module 50 as shown in FIG. 4. Thereby, the YC processing module 50 starts image processing for the input first block image data, generates Y and C signals, and outputs the Y and C signals to the NR processing module 60.

The NR processing module 60 starts image processing for the input Y and C signals, generates noise-reduced data (hereinafter, referred to as "first noise-reduced data") corresponding to the first block image data, and outputs the first noise-reduced data to the output DMA module 70. Thereby, the output DMA module 70 writes the input first noise-reduced data to the buffer C (72) within the output DMA module 70. When the writing of the first noise-reduced data to the buffer C (72) is completed, the output DMA module 70 reads the first noise-reduced data from the buffer C (72), and outputs the first noise-reduced data to the DRAM 20 by the DMA.

Thereafter, when the reading of the first block image data from the DRAM 20 is completed, that is, when the number of times of writing to the buffer is consistent with the number of times set in the write count register 413 by the sequencer 30 in the processing 101, the input DMA module 40 outputs the DMA completion interrupt signal to the sequencer 30.

If the DMA completion interrupt signal is input from the input DMA module 40, the sequencer 30 first performs processing 200. In the processing 200, the sequencer 30 first performs register settings such as necessary parameters or the number of input data when image data of the next (second) block (hereinafter referred to as "second block image data") is read from the DRAM 20 for the side of the DMA I/F 41 (the I/F unit 411, the SRAM write control unit 412, and the write count register 413) within the input DMA module 40 in processing 201. For example, the number of times of writing to the buffer is set in the write count register 413 within the input DMA module 40.

Subsequently, the sequencer 30 resets an operation state at the side of the DMA I/F 41 within the input DMA module 40 in processing 202. In the reset at the side of the DMA I/F unit 41, the sequencer 30 outputs only the input reset signal to the input DMA module 40. Thereafter, in processing 203, the sequencer 30 outputs the DMA start trigger signal to the input DMA module 40 after releasing the reset for the input DMA module 40. Thereby, the input DMA module 40 starts reading of the second block image data from the DRAM 20 by DMA.

In the processing 202, because the sequencer 30 does not output the common reset signal to the input DMA module 40, the state-A unit 421, the state-B unit 431, the write pointer 401, and the read pointer 402 within the input DMA module 40 are not reset. Thus, when the input DMA module 40 reads the second block image data from the DRAM 20 and writes the read second block image data to the buffer within the input DMA module 40, the writing of the read block image data is started from a buffer different from a used buffer when the first block image data is finally written. More specifically, as shown in FIG. 6, a buffer to which the second block image data is first written becomes the buffer B (43) when the buffer to which the first block image data is finally written is the buffer A (42). Thereby, when the input DMA module 40 writes the second block image data to the buffer, it is possible to avoid the first block image data not output to the YC processing module 50 from being overwritten.

Thereafter, when outputting of the first block image, data to the YC processing module 50 is completed, that is, when the number of times, of reading from the buffer is consistent with the number of times set in the read count register 443 by the sequencer 30 in the processing 101, the input DMA module 40 outputs the output completion interrupt signal to the sequencer 30.

When the output completion interrupt signal is input from the input DMA module 40, the sequencer 30 performs processing 210. In the processing 210, the sequencer 30 first performs register settings such as necessary parameters or the number of output data when the second block image data is output to the YC processing module 50 for the side of the buffer read circuit 44 (the SRAM read control unit 441, the I/F unit 442, and the read count register 443) within the input DMA module 40 in processing 211. For example, the number of times of reading from the buffer is set in the read count register 443 within the input DMA module 40.

Subsequently, in processing 212, the sequencer 30 resets an operation state at the side of the buffer read circuit 44 within the input DMA module 40. In the reset at the side of the buffer read circuit 44, the sequencer 30 outputs only the output reset signal to the input DMA module 40. Thereafter, the sequencer 30 releases the reset for the input DMA module 40. Thereby, the input DMA module 40 is in a state in which outputting of the second block image data can be started in response to a data request signal from the YC processing module 50.

In the processing 212, because the sequencer 30 does not output the common reset signal to the input DMA module 40, the state-A unit 421, the state-B unit 431, the write pointer 401, and the read pointer 402 within the input DMA module 40 are not reset. Thus, reading of the second block image data output from the buffer to which the input DMA module 40 starts writing of the second block image data to the YC processing module 50 is started. More specifically, as shown in FIG. 6, because the second block image data is first written to the buffer B (43), reading of the second block image data from the buffer B (43) is started. Thereby, when the input DMA module 40 reads the second block image data from the buffer, it is possible to avoid an operation of reading block image data, remaining in different buffers and outputting the read block image data to the YC processing module 50.

Thereafter, when the YC processing module 50 completes image processing for the first block image data, the completion interrupt signal is output to the sequencer 30. When the completion interrupt signal is input, the sequencer 30 performs processing 300. In the processing 300, the sequencer 30 first performs register settings such as necessary parameters or the number of input/output data when image processing for the second block image data is performed for the YC processing module 50 in processing 301. Subsequently, the sequencer 30 releases the reset in processing 302 after an operation state of the YC processing module 50 is reset. Thereby, the YC processing module 50 continuously starts image processing for the second block image data input from the input DMA module 40.

Thereafter, when the image processing for the first block image data is completed, the NR processing, module 60 outputs the completion interrupt signal to the sequencer 30. When the completion interrupt signal is input, the sequencer 30 performs processing 400. In the processing 400, the sequencer 30 first performs register settings such as necessary parameters or the number of input/output data when image processing for the second block image data is performed for the NR processing module 60 in processing 401. Subsequently, the sequencer 30 releases the reset in processing 402 after an operation state of the NR processing module 60 is reset. Thereby, the NR processing module 60 continuously starts image processing for Y and C signals of the second block image data input from the YC processing module 50.

When the NR processing module 60 completes image processing for the first block image data, the output DMA module 70 also completes writing of the first noise-reduced data to the buffer C (72) within the output DMA module 70. That is, the number of times set in the write count register 713 by the sequencer 30 in the processing 101 is consistent with the number of times of writing to the buffer, and the output DMA module 70 outputs the input completion interrupt signal to the sequencer 30.

When the input completion interrupt signal is input from the output DMA module 70, the sequencer 30 performs processing 500. In the processing 500, the sequencer 30 first performs register settings such as necessary parameters or the number of input data when noise-reduced data (hereinafter referred to as "second noise-reduced data") corresponding to the second block image data output from the NR processing module 60 is written to the buffer for the side of the buffer write circuit 71 (the IF unit 711, the SRAM write control unit 712, and the write count register 713) within the output DMA module 70 in processing 501. For example, the number of times of writing to the buffer is set in the write count register 713 within the output DMA module 70.

Subsequently, in processing 502, the sequencer 30 resets an operation state at the side of the buffer write circuit 71 within the output DMA module 70. In the reset at the side of the buffer write circuit 71, the sequencer 30 outputs only the input reset signal to the output DMA module 70. Thereafter, the sequencer 30 releases the reset for the output DMA module 70. Thereby, the output DMA module 70 is in a state in which writing of the second noise-reduced data to the buffer can be started in response to a data output request signal from the NR processing module 60.

In the processing 502, because the sequencer 30 does not output the common reset signal to the output DMA module 70, the state-C unit 721, the state-D unit 731, the write pointer 701, and the read pointer 702 within the output DMA module 70 are not reset. Thus, when the output DMA module 70 writes the second noise-reduced data to the buffer within the output DMA module 70, the writing of the second noise-reduced data is started from a buffer different from a used buffer when the first noise-reduced data is finally written. More specifically, as shown in FIG. 6, a buffer to which the second noise-reduced data is first written becomes the buffer D (73) when the buffer to which the first noise-reduced data is finally written is the buffer C (72). Thereby, when the output DMA module 70 writes the second noise-reduced data to the buffer, it is possible to avoid the first noise-reduced data not output to the DRAM 20 from being overwritten.

Thereafter, when the outputting of the first noise-reduced image data to the DRAM 20 is completed, that is, when the number of times of reading from the buffer is consistent with the number of times set in the read count register 743 by the sequencer 30 in the processing 101, the output DMA module 70 outputs the DMA completion interrupt signal to the sequencer 30.

When the DMA completion interrupt signal is input from the output DMA module 70, the sequencer 30 performs processing 510. In the processing 510, the sequencer 30 first performs register settings such as necessary parameters or the number of output data when the second noise-reduced data is output to the DRAM 20 for the side of the DMA I/F 74 (the SRAM read control unit 741, the I/F unit 742, and the read count register 743) within the output DMA module 70 in processing 511. For example, the number of times of reading from the buffer is set in the read count register 743 within the output DMA module 70.

Subsequently, in processing 512, the sequencer 30 resets an operation state at the side of the DMA I/F 74 within the output DMA module 70. In the reset at the side of the DMA I/F 74, the sequencer 30 outputs only the output reset signal to the output DMA module 70. Thereafter, after the reset for the output DMA module 70 is released, the sequencer 30 outputs the DMA start trigger signal to the output DMA module 70 in processing 513. Thereby, the output DMA module 70 starts outputting of the second noise-reduced data to the DRAM 20 by DMA.

In the processing 512, because the sequencer 30 does not output the common, reset signal to the output DMA module 70, the state-C unit 721, the state-D unit 731, the write pointer 701, and the read pointer 702 within the output DMA module 70 are not reset. Thus, reading of the second noise-reduced data output from the buffer to which the output DMA module 70 starts writing of the second noise-reduced data to the DRAM 20 is started. More specifically, as shown in FIG. 6, because the second noise-reduced data is first written to the buffer D (73), the reading of the second noise-reduced data from the buffer D (73) is started. Thereby, when the output DMA module 70 reads the second noise-reduced data from the buffer, it is possible to avoid an operation of reading noise-reduced data remaining in different buffers and outputting the read noise-reduced data to the DRAM 20.

Thereafter, when the outputting of the second noise-reduced data to the DRAM 20 is completed, that is, when the number of times of reading from the buffer is consistent with the number of times set in the read count register 743 by the sequencer 30 in the processing 511, the output DMA module 70 outputs the DMA completion interrupt signal to the sequencer 30. The DMA completion interrupt signal from the output DMA module 70 is input to the sequencer 30, so that the pipeline process for data of a still image of one frame in the image processing apparatus 1 is completed.

In the input DMA module 40 included in the image processing apparatus 1 of this embodiment as described above, it is possible to respectively output the DMA completion interrupt signal when reading of block image data from the DRAM 20 is completed and the output completion interrupt signal when outputting of block image data to the YC processing module 50 is completed to the sequencer 30. In the output DMA module 70 included in the image processing apparatus 1 of this embodiment, it is possible to respectively output the input completion interrupt signal when writing of noise-reduced data from the NR processing module 60 is completed and the DMA completion interrupt signal when outputting of noise-reduced data to the DRAM 20 is completed to the sequencer 30. Thereby, the sequencer 30 of the image processing apparatus 1 of this embodiment can start reading of the second block image data from the DRAM 20 while the input DMA module 40 outputs the first block image data to the YC processing module 50. The sequencer 30 can start writing of the second noise-reduced data output by the NR processing module 60 to the buffer while the output DMA module 70 outputs the first noise-reduced data to the DRAM 20. Thereby, it is possible to perform the pipeline process so that a waiting time for inputting/outputting data between the processing modules constituting the pipeline, is shortened.

According to an embodiment of the present invention as described above, a reset control unit of a processing module having large time loss in the respective processing modules constituting the pipeline is separated by an input side and an output side of the corresponding processing module. A configuration is made to output a signal indicating that processing is completed every time processing of the input or output side of the processing module is completed. More specifically, for example, the input DMA module 40 is separated into the side of the DMA I/F 41 and the side of the buffer read circuit 44, which output the DMA completion interrupt signal and the output completion interrupt signal, respectively. The output DMA module 70 is separated into the side of the buffer write circuit 71 and the side of the DMA I/F 74, which output the input completion interrupt signal and the DMA completion interrupt signal, respectively. Thereby, it is possible to start the next processing even if other processing is not completed when processing at one of the input side and the output side of the processing module is completed, and shorten a waiting time of data input from the previous-stage processing module constituting the pipeline. Thereby, it is possible to reduce a loss time in the pipeline process.

Although the case where processing modules (more specifically, the input DMA module 40 and the output DMA module 70), which acquire or output data by DMA transmission to any one of an input side and an output side are applied, has been described in this embodiment, a configuration of the processing modules is not limited to the embodiment of the present invention. For example, both the input side and the output side can be applied to a processing module that acquires or outputs data by an I/F other than DMA.

Although an example in which the input DMA module 40, the YC processing module 50, the NR processing module 60, and the output DMA module 70 constitute the pipeline has been described in this embodiment, the processing modules constituting the pipeline are not limited to the embodiment of the present invention.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A data processing apparatus comprising:
   a plurality of buffer units that stores data;
   a data write control unit that writes input data to any one of the plurality of buffer units by exclusively controlling the plurality of buffer units; and
   a data read control unit that reads output data to be output from any one of the plurality of buffer units by exclusively controlling the plurality of buffer units, and wherein
   the data write control unit outputs a data write completion signal indicating that the writing of the input data is completed when the writing of the input data is completed,
   the data read control unit outputs a data read completion signal indicating that the reading of the output data is completed when the reading of the output data to be output is completed, wherein
   a buffer information notification unit that retains information of the plurality of buffer units, and wherein
   the information of the buffer units retained in the buffer information notification unit comprises:
      buffer information that indicates whether the input data is writable to each of the plurality of buffer units or whether the output data is readable from each of the plurality of buffer units;
      data write information that indicates which of the plurality of buffer units the input data is written to; and
      data read information that indicates which of the plurality of buffer units the output data is read from,
   the data write control unit determines a buffer unit to which the input data is written based on the data write information retained in the buffer information notification unit, and writes input data based on the buffer information corresponding to the determined buffer unit, and
   the data read control unit determines a buffer unit from which the output data is read based on the data read information retained in the buffer information notification unit, and reads output data to be output based on the buffer information corresponding to the determined buffer unit.

2. The data processing apparatus according to claim 1, wherein
   the data write control unit determines that the writing of the input data is completed based on the number of times of writing the input data to the plurality of buffer units by the data write control unit and the preset number of times of writing of the input data, and
   the data read control unit determines that the reading of the output data is completed based on the number of times of reading the output data from the plurality of buffer units by the data read control unit and the preset number of times of reading of the output data.

3. The data processing apparatus according to claim 1, wherein
   the data write control unit changes the buffer information and the data write information corresponding to the determined buffer unit when the writing of the input data to the determined buffer unit is completed, and
   the data read control unit changes the buffer information and the data read information corresponding to the determined buffer unit when the reading of the output data from the determined buffer unit is completed.

4. An image processing apparatus comprising a data processing apparatus, the data processing apparatus comprising:
   a plurality of buffer units that stores data;
   a data write control unit that writes input data to any one of the plurality of buffer units by exclusively controlling the plurality of buffer units; and
   a data read control unit that reads output data to be output from any one of the plurality of buffer units by exclusively controlling the plurality of buffer units, and wherein
   the data write control unit outputs a data write completion signal indicating that the writing of the input data is completed when the writing of the input data is completed,
   the data read control unit outputs a data read completion signal indicating that the reading of the output data is completed when the reading of the output data to be output is completed,
   the data write control unit performs settings related to writing of image data after the data write completion signal is output,
   the data read control unit performs settings related to reading of the image data after the data read completion signal is output; and wherein
   a buffer information notification unit that retains information of the plurality of buffer units, and wherein
   the information of the buffer units retained in the buffer information notification unit comprises:
      buffer information that indicates whether the input data is writable to each of the plurality of buffer units or whether the output data is readable from each of the plurality of buffer units;
      data write information that indicates which of the plurality of buffer units the input data is written to; and
      data read information that indicates which of the plurality of buffer units the output data is read from,
   the data write control unit determines a buffer unit to which the input data is written based on the data write information retained in the buffer information notification unit, and writes input data based on the buffer information corresponding to the determined buffer unit, and
   the data read control unit determines a buffer unit from which the output data is read based on the data read information retained in the buffer information notification unit, and reads output data to be output based on the buffer information corresponding to the determined buffer unit.

* * * * *